United States Patent [19]
Dunn, Jr.

[11] 3,865,920
[45] Feb. 11, 1975

[54] PROCESS FOR BENEFICIATING A TITANIFEROUS ORE AND PRODUCTION OF CHLORINE AND IRON OXIDE

[75] Inventor: Wendell E. Dunn, Jr., North Sydney, Australia

[73] Assignee: Rutile & Zircon Mines (Newcastle) Limited, Sydney, New South Wales, Australia

[22] Filed: Mar. 14, 1973

[21] Appl. No.: 341,043

[52] U.S. Cl. ................. 423/74, 423/148, 423/149, 423/493, 423/500, 423/610, 423/633, 423/659
[51] Int. Cl. ..... C01g 49/06, C01b 7/02, C01g 23/04
[58] Field of Search ............ 423/633, 79, 610, 500, 423/74, 148, 149, 493

[56] References Cited
UNITED STATES PATENTS

| | | |
|---|---|---|
| 3,325,252 | 6/1967 | Wikswo et al. ................. 423/633 X |
| 3,628,913 | 12/1971 | Uhland ................................ 423/79 |
| 3,699,206 | 10/1972 | Dunn, Jr. .............................. 423/79 |

Primary Examiner—Edward Stern

[57] ABSTRACT

Chlorine and iron oxide are produced by the oxidation of iron chlorides and mixtures thereof, produced in the chloride process for beneficiating titaniferous ores, by injecting oxygen in the gas space above the fluidized bed. This void contains iron chloride when the ore is being beneficiated at a temperature of about 1,250° to 1,380°K. The oxygen and iron chloride form a partially oxidized mixture which is passed to a flue and cooled to about 1,025°K to complete the oxidation. The iron oxide and unreacted ferric chloride are recycled to the reactor.

11 Claims, 2 Drawing Figures

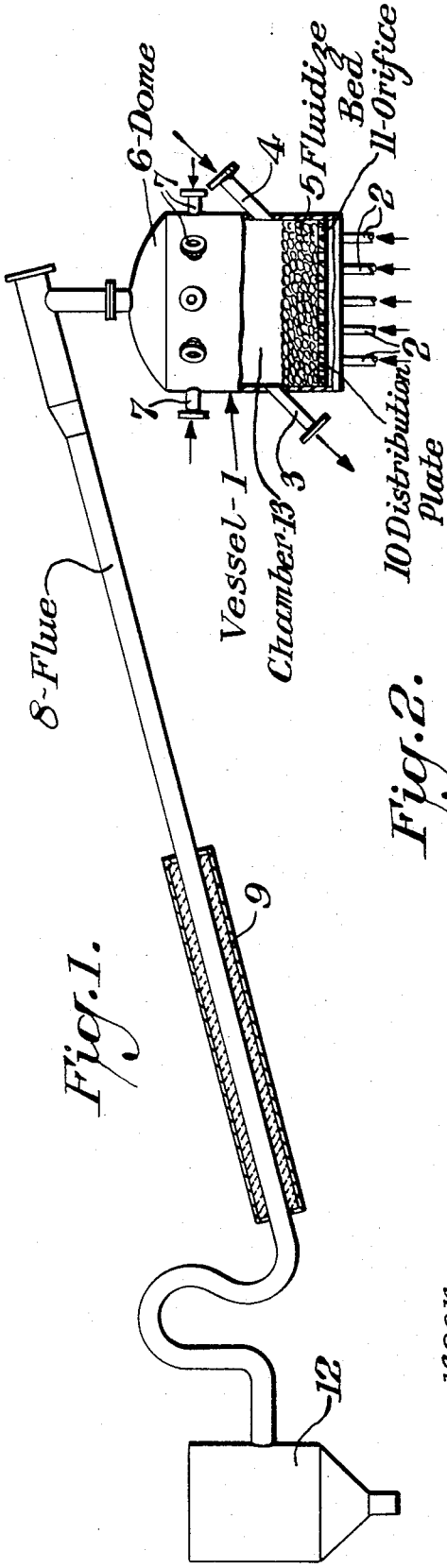
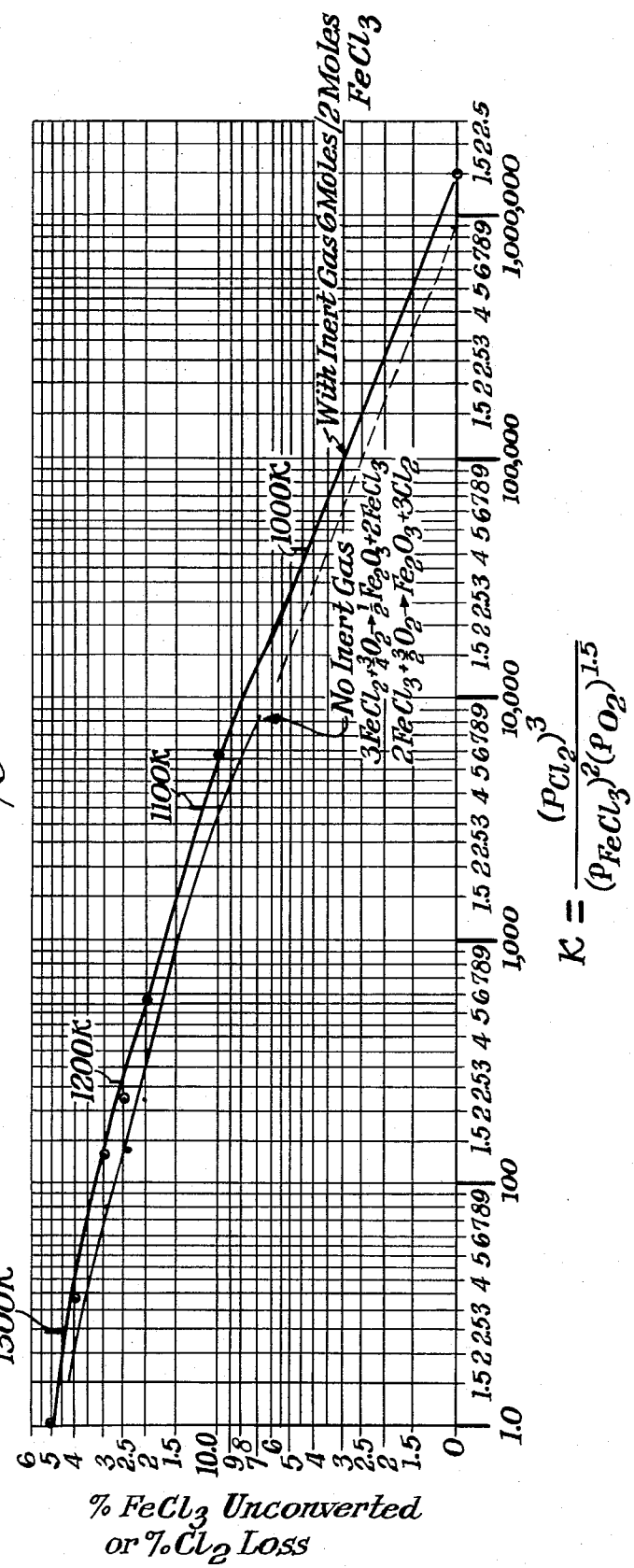

3,865,920

PROCESS FOR BENEFICIATING A TITANIFEROUS ORE AND PRODUCTION OF CHLORINE AND IRON OXIDE

FIELD OF THE INVENTION

This invention relates to a process for the oxidation of iron chlorides.

BACKGROUND OF THE INVENTION

The beneficiation of titaniferous ores by the chloride process produces iron chlorides. In this method of beneficiation, the ore mixed with carbon is reacted with chlorine at a temperature of 1,075° to 1,425°K. The iron oxide component in the ore is converted to vaporized iron chlorides. An example of such a beneficiation process is described in my copending application Ser. No. 267,519 filed June 29, 1972. The vaporized iron chlorides are valuable in that they contain chlorine values which may be recovered. In addition dumping and disposal of these wastes are expensive in view of the recent antipollution regulations controlling dumping.

Chlorine has been produced from the by-product iron chloride. For example, L. W. Rowe, et.al., U.S. Pat. No. 2,657,967 described a process for oxidizing ferric chloride using stoichiometric amounts of oxygen at a temperature of 850°C to yield chlorine and finally divided iron oxide. J.P. Wikswo, et.al., U.S. Pat. No. 3,325,252 describes a process for the oxidation of ferric chloride, a difficult material to handle, by a two stage process in which ferric chloride and oxygen are heated at about 750°C. in the first stage and the mixture obtained is passed into a second stage in which the temperature is maintained at a temperature at least 25°C lower than the first stage. In Wikswo, cooling is accomplished by the addition of alumina particles or inert solids which are recycled.

In have invented a simplified improved process for the production of chlorine and iron oxides adopted to use ferric chloride and ferrous chloride and mixtures thereof which provides economies by utilization of some of the heat produced by oxidation of the iron chlorides and which eliminates plugging problems prevalent in prior art processes.

SUMMARY OF THE INVENTION

This invention is directed to a process for the beneficiation of a fluidized bed of titaniferous ore composed of essentially titanium dioxide and iron oxide by the partial high temperature chlorination of said ore in a reactor having a chamber above the fluidized ore bed whereby iron oxide is converted into a gaseous iron chloride; the improvement comprising producing chlorine and ferric oxide from said gaseous iron chloride by (a) contacting the gaseous iron chloride, heated to a temperature of 1,250° to 1,380°K, with oxygen in the chamber above the fluidized bed of titaniferous ore to form a partially oxidized mixture, at equilibrium, of iron chlorides, iron oxide, oxygen and chlorine, (b) passing the partially oxidized mixture through a cooled flue at a superficial velocity of at least 50 feet/second, whereby the iron chloride is further oxidized to chlorine and an equilibrium layer of ferric oxide which forms on the inside wall of the flue, said layer being continuously abraded by the solid products passing through the flue, and (c) separating the chlorine from unreacted ferric chloride and iron oxide.

The beneficiated ore is useful as a synthetic rutile for the making of titanium dioxide pigments. The chlorine produced is useful for producing titanium tetrachloride and for making insecticides.

Unreacted ferric chloride can be recycled to the reactor. The iron oxide and chlorine are collected and separated.

The chlorine produced can be recycled to the beneficiation reaction or to a $TiO_2$ chlorinator.

BRIEF DESCRIPTION OF THE DRAWINGS

The invention is illustrated by the drawings in which:

FIG. 1 is a schematic view illustrating the process equipment.

FIG. 2 is a graph showing the relationship of conversion of iron chloride to iron oxide or percent of chlorine loss versus the equilibrium of the oxidation of iron chlorides at various temperatures.

As shown in FIG. 1, titaniferous ore mixed with 10–30%, by weight, of carbon is placed in the vessel 1 through an ore inlet pipe 4. The vessel can be fitted with a U-shaped outlet flue (not shown) or to a straight flue 8. The vessel is fitted with a beneficiated ore outlet tube 3 for removing beneficiated ore, a plurality of oxygen jets 7 for introducing oxygen directly into the chamber 13 above the fluidized ore bed 5, a distribution plate 10 having a plurality of orifices 11 which supports the ore-carbon fluidized bed and a plurality of gaseous inlet tubes 2 located below the distribution plate. Chlorine which may be mixed with oxygen or an inert diluent such as nitrogen is introduced into the reactor through the gas inlet tubes at a rate sufficient to fluidize the ore-carbon bed. The reactor is heated to a temperature of 1,175° to 1,380°K. The reaction of chlorine with the ore-carbon mixture produces iron chlorides (ferrous chloride, ferric chloride or a mixture thereof) which pass out of the bed into a chamber 13 above the bed. Oxygen jets 7 are arranged around the vessel so that the oxygen is introduced into the chamber above the pluming level of the fluidized bed of ore and fills the top of the reactor. Optionally the oxygen inlet jets may be located in the dome 6 and directed downward into the chamber. The reaction between oxygen or air with iron chloride formed by the ore beneficiation produces a partially oxidized mixture of ferric chloride, iron oxide ($Fe_2O_3$), chlorine and oxygen which can contain carbon dioxide and any diluent gas. The temperature of the iron chloride is in the range of 1,250° to 1,380°K and the temperature of the partially oxidized mixture is above 1,575°K if the gas rising from the beneficiator is predominately $FeCl_2$ and lower if predominantly $FeCl_3$.

The partially oxidized mixture passes from the vessel to the flue 8 wherein the mixture is progressively cooled to a temperature of about 925°K, or from, for example, about 1,400° to 1,575° K to about 1,000° K. Iron oxide is separated from the chlorine and ferric chlorides by a cyclone 12. The chlorine is separated from the ferric chloride by cooling. Additional cooling can be obtained by a water jacket 9.

The vessel can be constructed of water cooled mild steel and the flue can be constructed of stainless steel.

The ilmenite ore can be any of the beach sands ilmenites as well as other ilmenites having a particle size of +60–150 mesh.

DETAILED DESCRIPTION OF THE INVENTION

This invention consists of a process for the oxidation of vaporous iron chlorides, obtained from a fluidized bed of ilmenite and coke reacted with chlorine, by mixing with oxygen sufficient to react all iron values to $Fe_2O_3$ and provide an oxygen excess. The reaction is initially conducted in the space directly above the fluidized bed. The reaction liberates heat and forms a partially oxidized mixture as a gaseous cloud containing iron oxide nuclei. The initial oxidation mixture produces heat which radiates from the cloud to the fluidized bed surface thus requiring less carbon combustion to maintain the reaction temeprature of the beneficiation process in the bed.

The savings in heat were unexpectedly high, the optical opacity of the cloud of reacting iron chloride and fine iron oxide being almost complete. As a result the top and sides of the reactor were completely shielded from the fluidized bed and its customary heat loss was not experienced.

The partially oxidized gas mixture passes out of the vessel into a flue at high temperatures in the range of 1,300° to 1,600°K where it is progressively cooled by the transfer of heat to the walls of the flue. This temperature decrease shifts the equilibrium of the iron chloride-oxygen reaction allowing further reaction at the walls of the flue. Ferric oxide deposits as a layer which is abraded by the suspended solids carried by the gases flowing through the flue, removed at a rate equal to the formation rate of the layer.

A thicker layer of $Fe_2O_3$ reduces heat transfer and reduces the rate of chemical reaction since the mixture must cool to provide chemical potential for reaction, being near chemical equilibrium at all times. The thicker layer not only reduces heat transfer but increases gas velocity and increases abrasion. So an equilibrium obtains producing a layer of constant thickness at each point along the flue.

This equilibrium thickness can be varied somewhat at any point along the flue by changing the heat transfer through the wall of the flue. Hence, by water cooling the equilibrium thickness will increase, while external insulation will reduce heat transfer and if complete will cause the film to disappear since no deposit of $Fe_2O_3$ will be possible to form an oxide film.

Passing down the flue the temperature falls to a point where the chemical reaction rate is insufficient to keep the mixture of gases and $Fe_2O_3$ at chemical equilibrium. As the mixture inside the flue departs from equilibrium reaction can take place not only on the cooler wall but on the suspended solids in the gas stream. So the reaction continues until the temperature has declined so far that the mixture is not reacting significantly and chlorine formation stops. In this non-equilibrium region longer residence time can increase the chlorine yield. Hence flue diameter can be adjusted to improve yields.

After separation of the product ferric oxide, the gas stream is cooled and unreacted $FeCl_3$ is condensed, collected and returned to the beneficiator as a recycle stream.

Without being limited by theory, it is believed that when gaseous ferrous chloride is used it is immediately oxidized first to a mixture of ferric chloride, and ferric oxide nuclei in the space above the fluidized bed. The gaseous ferric chloride is partially oxidized to a mixture of ferric oxide, oxygen and chlorine. Further oxidation of ferric chloride to ferric oxide and chlorine is limited by the temperature equilibrium and the oxidation of ferric chloride thereafter proceeds less than 50% at a gas space temperature of 1,500°K, the approximate temperature of the gases in the chamber above the bed, when ferrous chloride is produced in the bed. This high temperature is an indication of the amount of heat liberated by the initial oxidation since the chlorination bed temperatures are maintained at 1,250° to 1,380°K. As the gas-solid mixture passes into the flue it is cooled by transfer of heat through the walls of the flue and the equilibrium shifts to allow higher conversion of ferric chloride to ferric oxide and chlorine. Conversion of ferrous chloride to ferric oxide and chlorine in excess of 95% can be attained. Unreacted condensed ferric chloride can be recycled.

A further advantage of conducting the oxidation in the space above the fluidized bed is that there is a net reduction of the amount of heat required to preheat the titaniferous ore, compared to a process in which the oxidation is conducted elsewhere. This can be explained as follows:

Oxidation is initiated in the upper portion of the chlorination reactor as shown in FIG. 1. The first reaction goes quickly and easily proceeds to completion as follows:

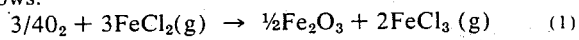

$$3/4 O_2 + 3FeCl_2(g) \rightarrow \frac{1}{2}Fe_2O_3 + 2FeCl_3(g) \qquad (1)$$

The second reaction is limited by temperature equilibrium and proceeds as follows:

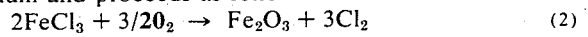

$$2FeCl_3 + 3/2 O_2 \rightarrow Fe_2O_3 + 3Cl_2 \qquad (2)$$

Using the JANAF tables (JANAF thermo-chemical tables, Joint Army Navy Bulletin, P.B. 168–370) the equilibrium curve can be drawn as shown in FIG. 2. This can be calculated from enthalpy data combined with equilibrium data. FIG. 2 plots $FeCl_3$ unconverted, i.e., percent of $Cl_2$ loss vs. the equilibrium constant K at various temperatures. K is defined by $[(pCl_2)^3/(pFeCl_3)^2(pO_2)^{1.5}]$ where p is the partial pressure of the gas. It is here shown that equilibrium shifts favorably as temperature decreases. The rapid attainment of equilibrium at high temperatures and ease of nucleation of iron oxide make the oxidation possible. The oxidation of ferric chloride is considered to take place in three stages. Initially, high temperature is developed wherein the reaction nucleates the iron oxide, and drives to equilibrium at about 1,400°K. A substantial portion of the reaction occurs in the fluidized reactor top, the amount of iron oxide being formed is about 40–50% of the total.

Using JANAF tables we can calculate the heat release of the reactions occurring in a combined beneficiator-oxidizer.

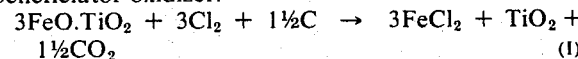
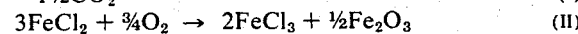
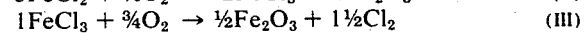

$$3FeO \cdot TiO_2 + 3Cl_2 + 1\frac{1}{2}C \rightarrow 3FeCl_2 + TiO_2 + 1\frac{1}{2}CO_2 \qquad (I)$$
$$3FeCl_2 + \frac{3}{4}O_2 \rightarrow 2FeCl_3 + \frac{1}{2}Fe_2O_3 \qquad (II)$$
$$1FeCl_3 + \frac{3}{4}O_2 \rightarrow \frac{1}{2}Fe_2O_3 + 1\frac{1}{2}Cl_2 \qquad (III)$$

The first equation represents the overall beneficiation with iron being vaporized as ferrous chloride. With all reactants at 1,300°K it will produce 61,260 Kcal/gram mols but with cold $Cl_2$ feed the heat production is reduced to 36,840. Ore and coke feed preheated to 600°C will maintain heat balance.

Equation II and III represent the oxidation reaction and are highly heat productive. Equation III is written for only 50% reaction of the FeCl$_3$ produced in II to represent partial conversion in the reactor gas space before emergence in the flue. The heat production of these reactions at 1,300°K from reactants at that temperature is I. 61,260 Kcal/g.mol
II. 110,011 Kcal/g.mol
III. 33,365 Kcal/g.mol The second stage of the reaction is probably in the range between 1,400° to 1,250°K, and features heat removal and further oxidation. The equilibrium shifts favorably as the gases and solids cool, as shown in FIG. 2. This occurs in the first section of the flue.

Below 1,250°K the reaction departs from equilibrium and becomes reaction rate limited. This third stage of the reaction is probably between 1,250°K and 900°K and takes place in the flue. In order to match the decreased reaction rate it is desirable to remove heat at a slower rate by insulating this section of the flue or increasing the residence time by increasing the diameter of the flue. Increasing the diameter of the flue has the effect of reducing the velocity of the gases, increasing the retention time so that the particles which have already formed grow larger thereby increasing reaction surface area and ease of separation.

The following is an example to illustrate the foregoing:

In a typical reactor having a 7 foot outside diameter with a 9 inch brick lining for the fluidized portion of the reactor and a water cooled top section a heat loss of about 840,000 mpcu was experienced which required continuous O$_2$ (or air) feed to the bed to counteract the heat deficiency as well as an ore feed at 1,000°C (which would add about 340,000 mpcu at a feed rate of 35 lb. mols. of Cl$_2$/hr.) instead of 600°C for an adiabatic reactor. When the oxygen is turned on, or in the more usual case oxygen is fed continuously to the top and Cl$_2$ introduced to the fluidized bed to start ferrous chloride production, the gas space temperature rises rapidly and measured temperatures are in excess of 1,400°K. Input ore temperatures must now be lowered and N$_2$ addition (for bed cooling) may be needed while ore preheater temperatures are being lowered.

By varying the ferric/ferrous ratio of the beneficator off-gases one can greatly affect the heat generated by the beneficiation reaction (I) and consequently the ore preheat required. While this greatly affects the gas space temperatures it does not seem to seriously affect the flue oxidation conversion, and with recycle of FeCl$_3$ is of no concern in the chlorine recovery efficiency. Hence the optimum ferrous/ferric chloride ratio may be determined by other considerations. The iron chloride can be a mixture of about 90 percent, by weight, of ferrous chloride and 10 percent, by weight, of ferric chloride or can be a mixture of about 50 percent, by weight, of ferrous chloride and 50 percent, by weight, of ferric chloride or can be a mixture of about 10 percent, by weight, of ferrous chloride and 90 percent, by weight, of ferric chloride.

The carbon dust abraded from fluidized coke consumes oxygen in the gas space, so a hard coke rather than a soft char is desirable. Petroleum coke which has been calcined above 900°C has a low abrasion loss at a fluidizing velocity of 0.5 foot/sec. and may consume as little as 0.2 scfm O$_2$/ft$^2$ of bed surface, where the bed depth was 32 inches (static) and the coke concentration 20%. Passage of coke with ore through a preheater will eliminate the fine coke. Very little −60 remains from coke crushed − ¼ inch after a short residence time in the preheater and beneficiator.

Bubbles of high velocity, breaking the surface and carrying solids into the gas space do not tend toward high coke consumption since the particles are surrounded by an envelope of gas from the fluidized bed and the coke is relatively untouched by the oxygen of the gas space.

The particle size and the porosity of the product iron oxide can be controlled by regulating the velocity of the gases.

Since oxidation is conducted in the reactor dome, the velocity of the gases is slower so that a few atoms of ferric oxide particles coalesce first to form a crystal which is probably FeOCl or FeO$_{1.5}$ and a number of these provide a growth surface and determine the particle size. The particles, black in color, have an average diameter in excess of 0.7 microns.

The following Examples further illustrate the invention:

EXAMPLE 1

The iron chloride oxidation was conducted in the following apparatus:

a. A beneficiator composed of mild steel water cooled shell with a 7 foot diameter and a 12 foot height was lined as follows, two 9 inch courses 4 foot high and one 9 inch course to the top. The inside diameter above the bed was 4 inches in the fluidized section, and the diameter above the bed was 5.5 inches. Bed depth of the ore-carbon mixture was 32 inches (static bed) composed of 20%, by weight, of powdered coke added to Australia (east coast) ilmenite. Solids overflow was adjusted to maintain constant bed level. A 1½ inch center 3/16 inch jet refractory gas distributor fitted to the reactor allowed gases to enter below the bed and fluidized the ore coke mixture.

b. Four oxygen inlet ports 90° apart 1½ inch diameter were located on the reactor 4 foot above the ore bed level.

c. Attached to the reactor top was an oxidizing flue consisting of a 6 inch diameter stainless steel vertical pipe made in two 20 foot flanged sections with a 180° bend, passing downward and connecting to a 100 foot horizontal run of 6 inch flue terminating in a Fe$_2$O$_3$ separating cyclone chamber.

d. Sampling ports consisted of 1 inch diameter quick opening valves at the flue entrance and exit and at 20 foot intervals along the flue. Inconel shielded thermocouples extended 40 inches into the beneficiator from the top and four thermocouples extended into the fluidized bed. A purged pressure port was equipped to measured reactor top pressure.

e. Sampling was done with pre-evacuated gas sampling bulbs of 1 liter capacity with a stainless steel entrance tube. The bulbs were equipped with two stopcocks to allow gas purging and washing.

The beneficiator was operated with a continuous ilmenite-coke feed of 50 lbs/min with over-flow of bed to maintain a constant bed height. The operating bed temperature was held between 1,025° and 1,080°C by varying the preheat feed temperature and by the addition of O$_2$ below the bed for quick control. Chlorine was fed to the reactor from inlet tubes below the bed at a rate of 100 scfm and a bed velocity of 0.5 feet/sec was maintained. N$_2$ was substituted for O$_2$ when the temperature rose above the desired temperature range.

Above the bed O₂ was fed at the rate of 100 scfm. A portion of the oxygen was consumed by reacting with coke dust emitted from the bed. Independent tests showed this coke consumed between 2 and 17 scfm (standard cubic feet per minute) reacting to $CO_2$.

Flue temperature rose rapidly as $Cl_2$ was turned on and stabilized after about 30 minutes. Duplicate samples were taken 30 minutes and 1 hour after equilibrium temperatures were well established and showed the following conversion:

|  | Sample 1 | Sample 2 |
|---|---|---|
| Flue inlet | 69.3% | 72.1% |
| 40' | 86.3 | 82.7 |
| exit | — | 89.0 |

Samples taken over a 2 hour duration at various points along the flue showed:

| inlet to flue | 70% conversion |
|---|---|
| 40' | 80% conversion |
| exit | 89% conversion |

Manganese did not oxidize in the flue and was recovered as soluble $Mn^{++}$ salts. Chlorine was measured by KI titration after purging from the bulb, soluble iron and chloride by analysis of bulb washings. Chloride values agreed with iron analysis after correction for manganese chloride.

Examination of flue wall deposits showed variation in thickness from entrance to exit as follows:

| Entrance | 1" |
|---|---|
| 4" | ¾" |
| 20' | 5/10" |
| 40' | 3/10—¼" |
| 80' | 1/64" |

The bottom of the horizontal flue had a layer 1.8 inches thick. Surfaces were flow marked. A 3 inch diameter section connecting to the oxide cyclone chamber was bare.

The beneficiator top pressure was 3.6 psig, and the pressure drop measurement acros the oxidizing flue was 0.2–0.4 psig. Rapid chart recording of flue pressure drop showed a 0.1–0.2 psig variation present only when oxidation occurring, indicating turbulence caused by the reaction.

EXAMPLE 2

A similar apparatus described in Example 1 was used with a change of vertical flue diameter to 10 inch produce only a slightly better conversions of about 2%. The film or layer build-up was thicker, the entrance developing a 1 ½ to 2 inch thick layer. No change in iron oxide texture was noted. All iron oxide films observed were easily broken or scratched with the fingernail. Iron oxide films located at 40 foot down the flue and beyond were so soft it was difficult to take samples which would retain their shape. The thermal expansion was taken up by the vertical "hair pin" section of the flue. Although flues were air cooled during the runs, an experimental section 3 foot long was insulated and found to have no film. The first 4 feet of the flue when water cooled developed a thicker iron oxide film, at the water cooled-air cooled interface a ¼ inch film thickness reduction was noted. Flue outer surface temperatures measured with thermal crayons showed metal surface temperatures below 600°C.

EXAMPLE 3

Using an apparatus identical with Example 1 the unreacted $FeCl_3$ was condensed from the iron oxide product, cycloned out through a rotary valve into a fluidized bed and transported by dried air back to the beneficiator and recycled to the process to effect essentially a complete $FeCl_3$ conversion. The effect on operation was not noticeably changed, indicating that recycling is feasible.

EXAMPLE 4

The process described in Example 1 was repeated using a 3 inch stainless steel flue pipe 100 foot long. No film or layer build up was observed except for a very thin hard layer at the entrance of the flue. Conversions were not significantly above samples at the beneficiator exit, taken in later experiments. The 3 inch diameter was too small.

The iron product of example 1, 2, 3 and 4 was a coarse black $Fe_2O_3$. Electron microscope examination of the product showed sharp edged crystalline particles 1–7 $\mu$ of hexagonal habit which were easily cycloned from the gases and were free flowing. $MnCl_2$ was collected with the $Fe_2O_3$ and appeared as globules in electron micrographs of the oxide.

Numerous runs produced temperatures at the top of the reactor 1,050°C to above 1,200°C (thermocouples off scale). Depending upon $FeCl_2/FeCl_3$ ratio produced by the beneficiation, no change in product was noted with change from $FeCl_2$ to $FeCl_3$, nor did any changes in the flue film appear. Variation of the velocity of gas and product through the flue changed the iron oxide film thickness as expected, with high velocities giving thinner films. Time did not affect film thickness after about 30 minutes operation. Several runs of 1–2 hrs. duration showed no change in the equilibrium thickness of the film. Preferably the superficial rate of flow through the flue is 50 to 150 ft/sec. and most preferred is 50 to 100 ft/sec.

$TiO_2$ was present in recovered $Fe_2O_3$ and was about 0.7%, by weight, of $TiO_2$ fed. The analysis included $TiO_2$ from $TiCl_4$ as well. Small $TiO_2$ ore particles (blown over) were observed under microscopic examination of the iron oxide product. Laboratory reduction of samples of the ferric oxide magnetically separated from a water slurry yielded product of less than 0.1%, by weight, $TiO_2$.

Porosimeter measurements of flue film from various locations showed about 60% porosity with little variation regardless of position in the flue. All films were comprised of small crystals.

Upon start-up the horizontal section would bow until an oxide layer built up due to metal temperature differences caused by natural convection cooling favoring the bottom of the flue.

The amount of oxygen used should be in excess of the stoichiometric amount required to oxidize the ferrous chloride, ferric chloride or mixtures thereof to iron oxide and chlorine with allowance for burning the carbon blowover and an additional 10%.

The products of the reaction can be easily separated by standard methods. For example, a cyclone can be used to separate the iron oxide from vaporized unreacted ferric chloride, chlorine, and unreacted oxygen and nitrogen and carbon dioxide if present. The ferric chloride can be separated by cooling and condensing. The chlorine can be recycled to the beneficiator vessel or it can be purified by distillation.

The foregoing detailed description has been given for clarity of understanding only and no unnecessary limitations are to be understood therefrom. The invention is not limited to the exact details shown and described for obvious modifications will occur to those skilled in the art.

The preferred embodiments in which an exclusive privilege or position is claimed as follows:

1. In the process for beneficiating a titaniferous ore composed of essentially titanium dioxide and iron oxide to produce a synthetic rutile titanium dioxide product and gaseous iron chlorides wherein a fluidized bed of titaniferous ore mixed with 10–30%, by weight, of coke is contacted with chlorine, at elevated temperatures, to produce a partially chlorinated product whereby the iron oxide contained in said titaniferous ore is selectively converted to iron chlorides and said process is conducted in a reactor having a chamber above the fluidized bed, the improvement which comprises producing chlorine and ferric oxide from said gaseous iron chlorides by:
   a. contacting the gaseous iron chlorides, heated to a temperature of 1,250° to 1,380°K, with oxygen in the chamber above the fluidized bed of titaniferous ore to form a gaseous cloud comprised of a partially oxidized mixture of iron chlorides, iron oxide, iron oxide nuclei, oxygen and chlorine;
   b. passing the partially oxidized mixture through a cooled flue, at a superficial velocity of at least 50 feet/sec, whereby substantially the remaining iron chloride is further oxidized to chlorine and an equilibrium layer of ferric oxide formed on the inside wall of the flue is continuously abraded by iron oxide solid product passing through the flue, and
   c. separating the chlorine from unreacted ferric chloride and ferric oxide.

2. A process as in claim 1 where the partially oxidized mixture is cooled from about 1,400° to 1,575°K to about 1,000°K.

3. A process as in claim 1 wherein the amount of added oxygen is 10 per cent in excess of the stoichiometric amount required to oxidize the iron chloride to ferric oxide and chlorine.

4. The process of claim 1 wherein the superficial rate of flow of the partially oxidized mixture through the flue is in the range of 50 to 100 ft/sec.

5. The process of claim 1 wherein the iron chloride is ferrous chloride and the partially oxidized mixture is cooled to a temperature of 1,000°K to form a mixture of ferric chloride, ferric oxide, and chlorine.

6. The process of claim 5 wherein the amount of added oxygen is 10 percent in excess of the stoichiometric amount required to oxidize the ferrous chloride to ferric oxide and chlorine.

7. The process of claim 5 wherein the rate of flow of the partially oxidized mixture through the flue at a superficial velocity is in the range of 50 to 100 ft/sec.

8. The process of claim 1 wherein the iron chloride is a mixture of about 90 percent, by weight, of ferrous chloride and 10 percent, by weight, of ferric chloride.

9. The process of claim 1 wherein the iron chloride is a mixture of about 50 percent, by weight, of ferrous chloride and 50 percent, by weight, of ferric chloride.

10. The process of claim 1 wherein the iron chloride is a mixture of about 10 percent, by weight, of ferrous chloride and 90 percent, by weight, of ferric chloride.

11. The process of claim 1 comprising separating unreacted ferric chloride from chlorine and ferric oxide and injecting the unreacted ferric chloride to the reactor.

* * * * *